Figure 1:
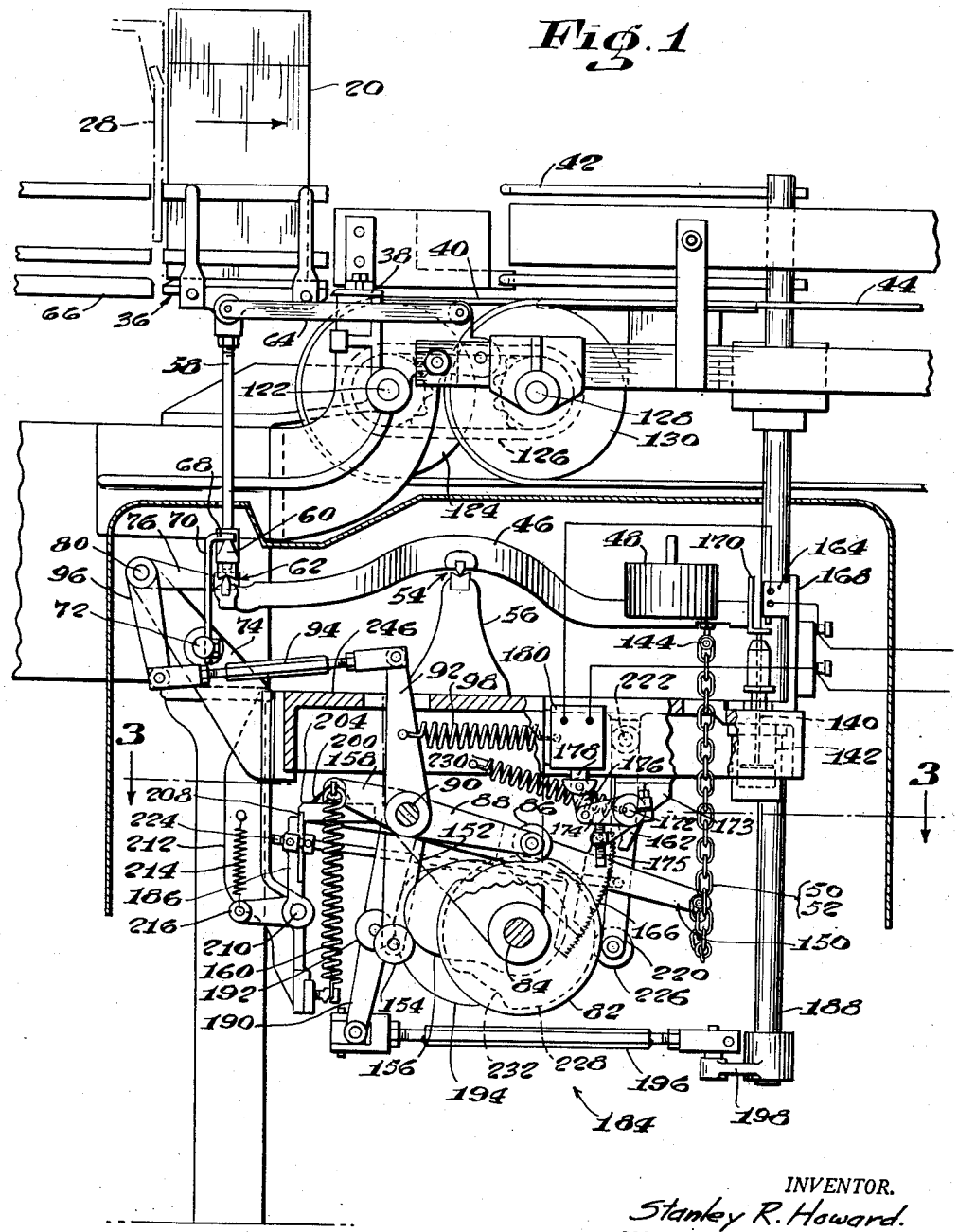

April 20, 1954

S. R. HOWARD 2,676,009

CHECK WEIGHING MECHANISM

Filed Dec. 12, 1947

10 Sheets-Sheet 2

INVENTOR.
Stanley R. Howard
BY
J. Stanley Churchill
ATTORNEY

INVENTOR.
Stanley R. Howard
BY J. Stanley Churchill
ATTORNEY

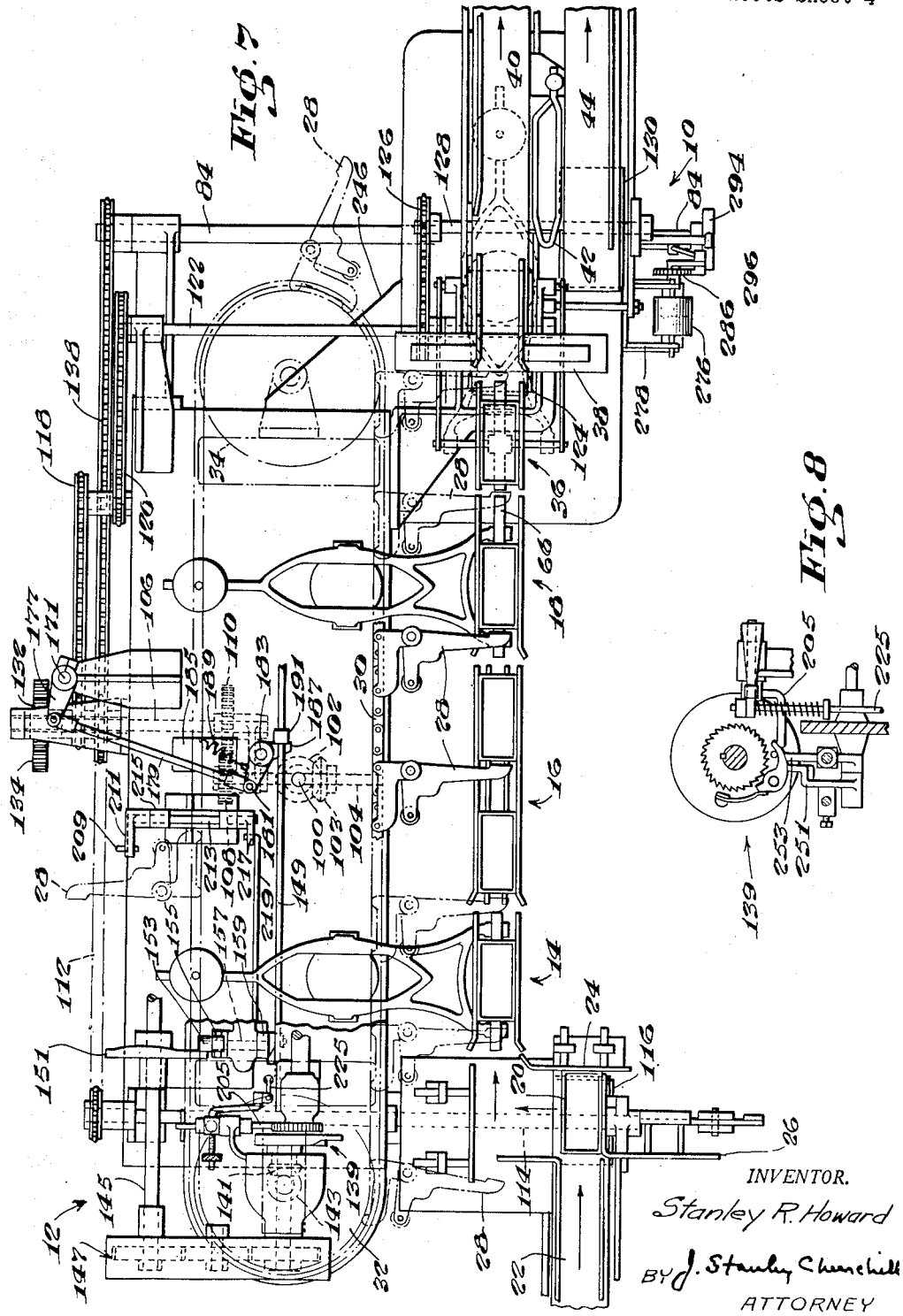

April 20, 1954
S. R. HOWARD
2,676,009
CHECK WEIGHING MECHANISM
Filed Dec. 12, 1947
10 Sheets-Sheet 5
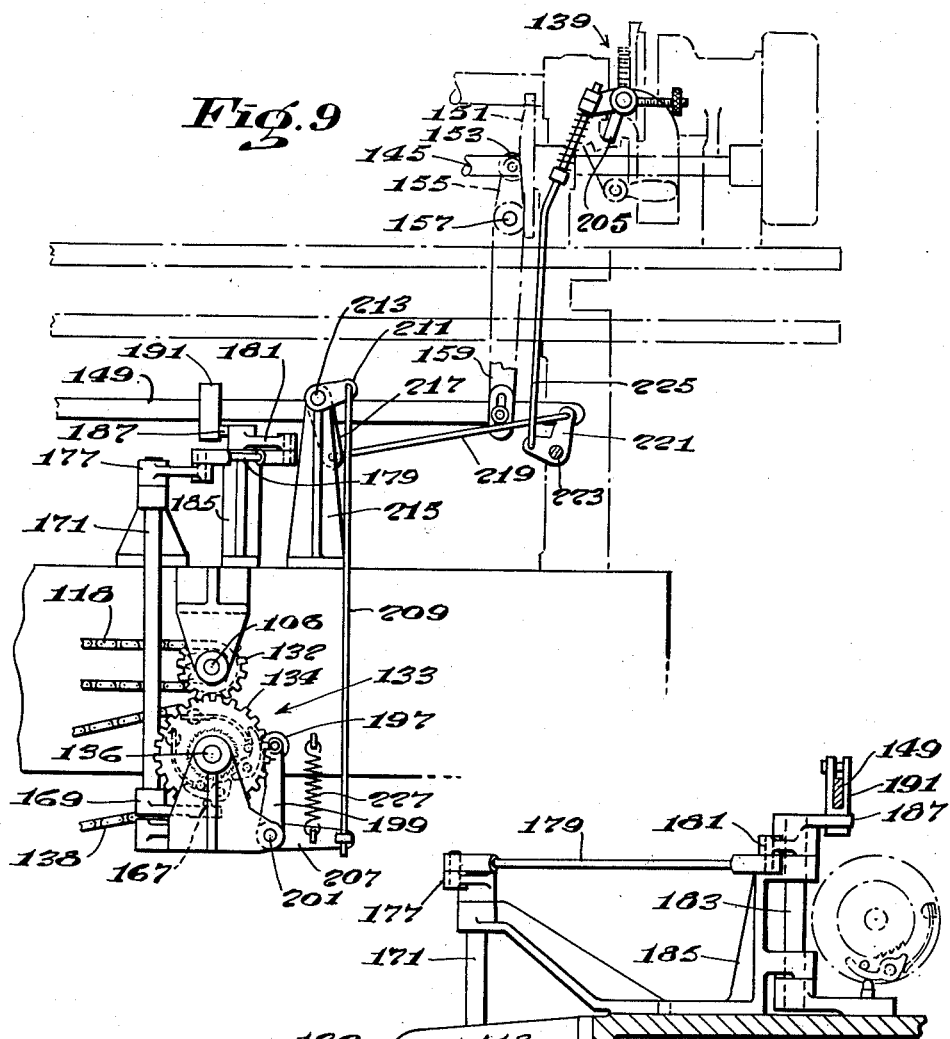
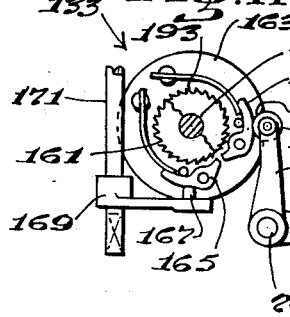
INVENTOR.
Stanley R. Howard
BY J. Stanley Churchill
ATTORNEY

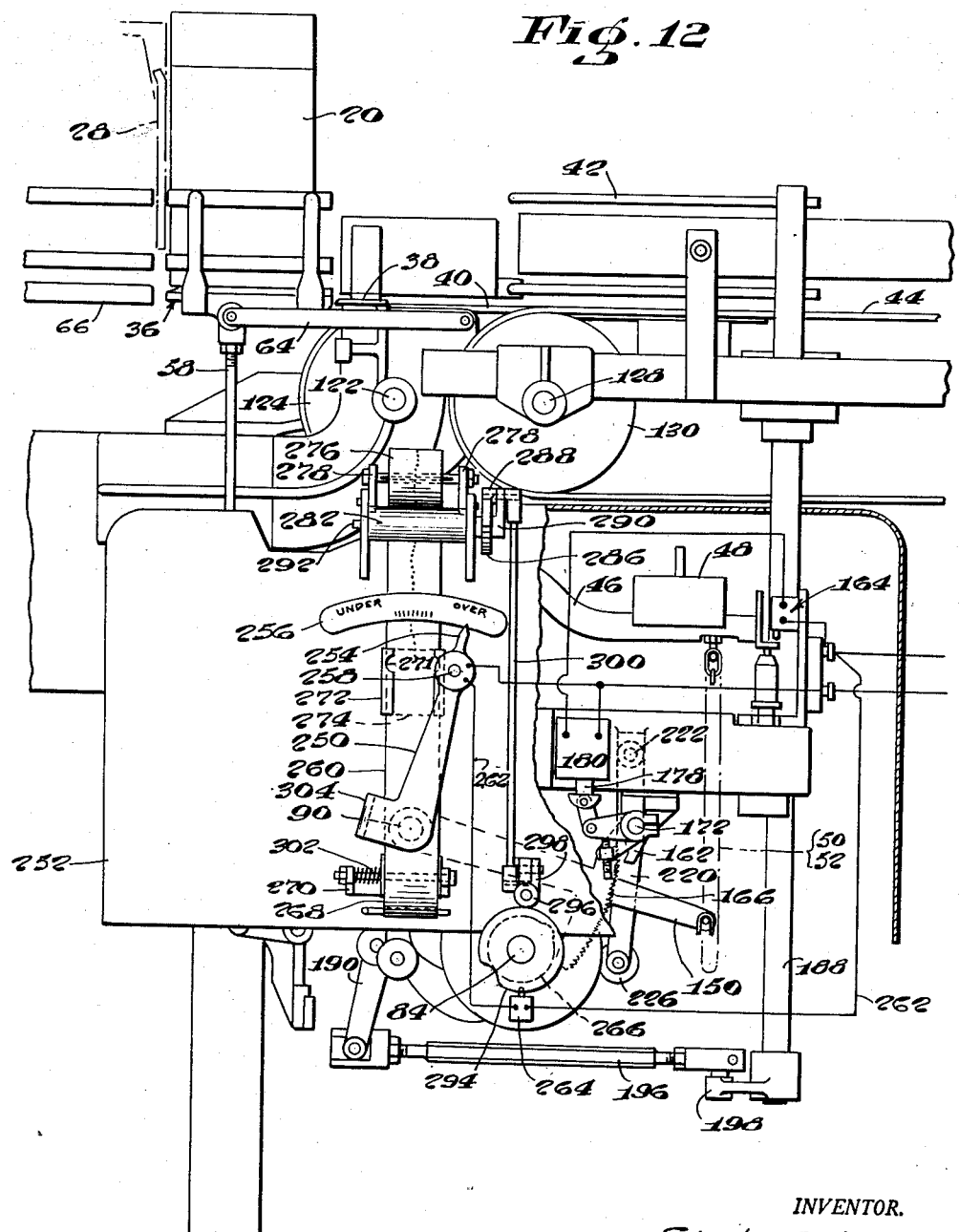

April 20, 1954  S. R. HOWARD  2,676,009
CHECK WEIGHING MECHANISM
Filed Dec. 12, 1947  10 Sheets-Sheet 7
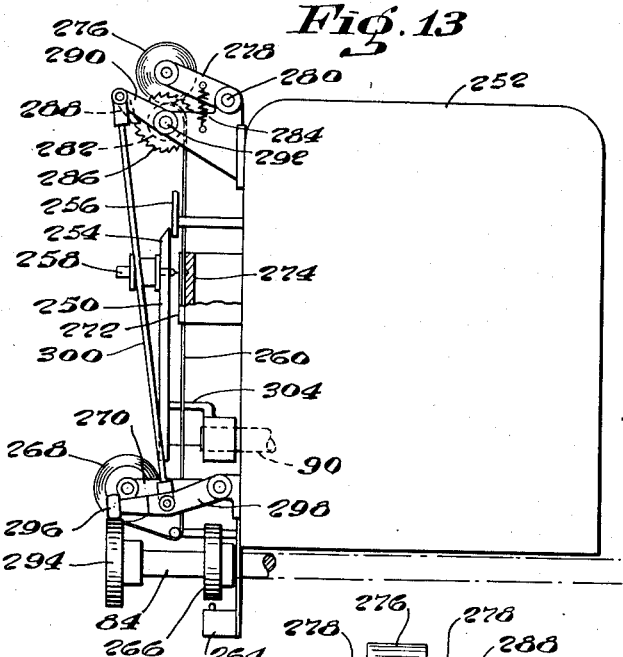
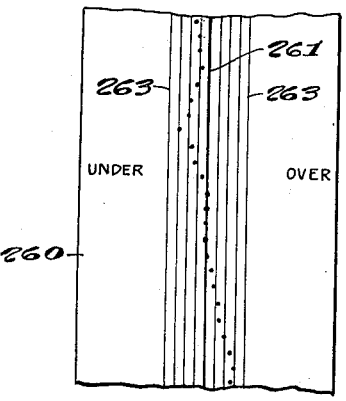
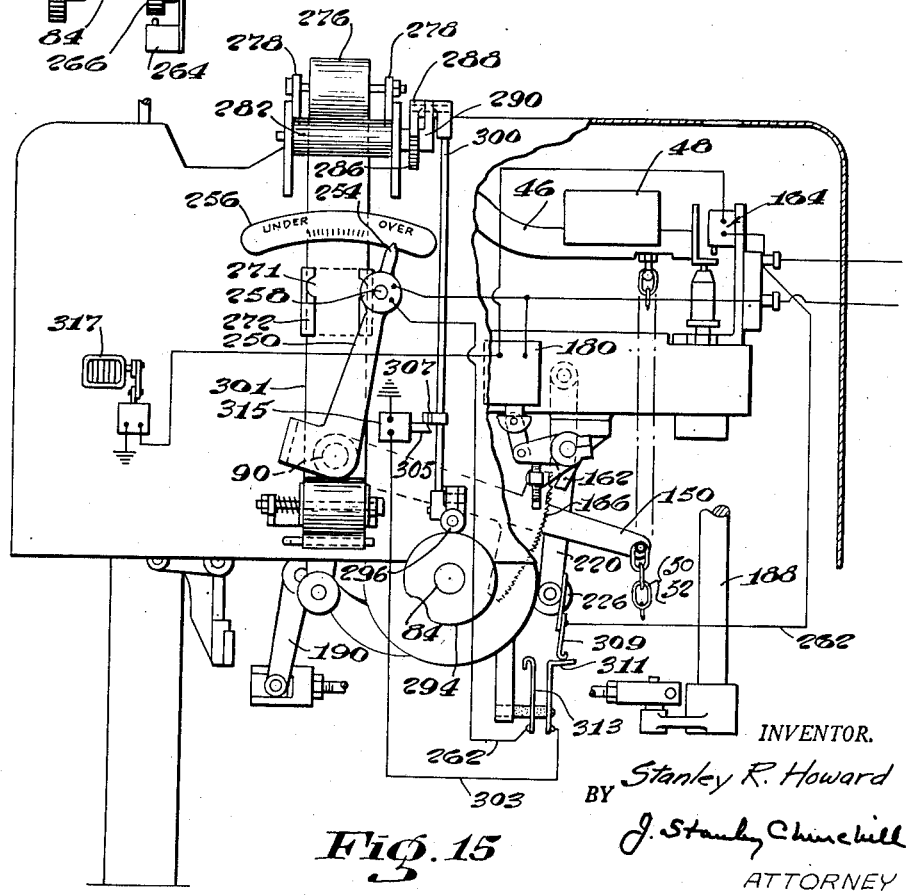
INVENTOR.
Stanley R. Howard
BY J. Stanley Churchill
ATTORNEY

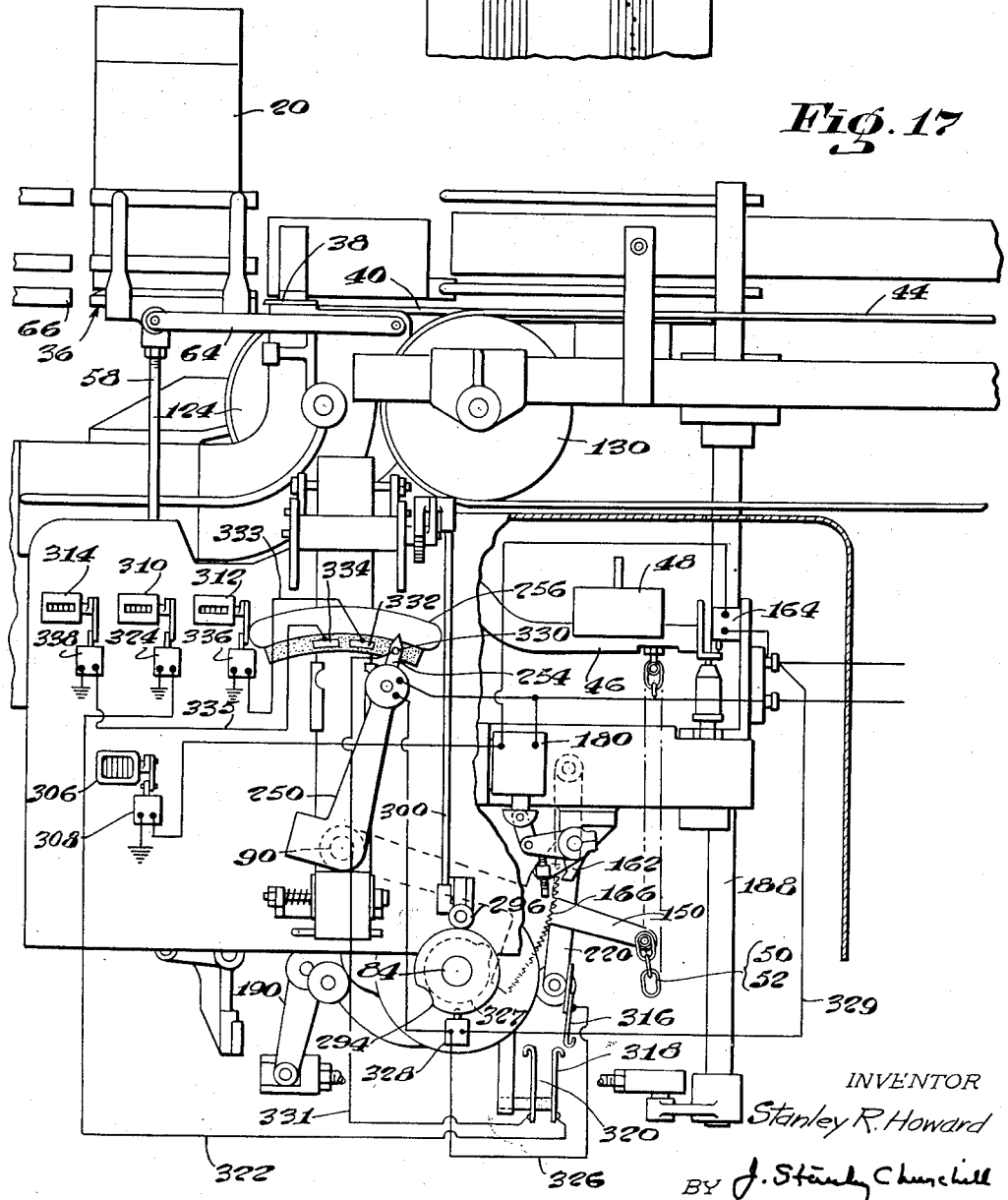

April 20, 1954   S. R. HOWARD   2,676,009
CHECK WEIGHING MECHANISM
Filed Dec. 12, 1947   10 Sheets-Sheet 9
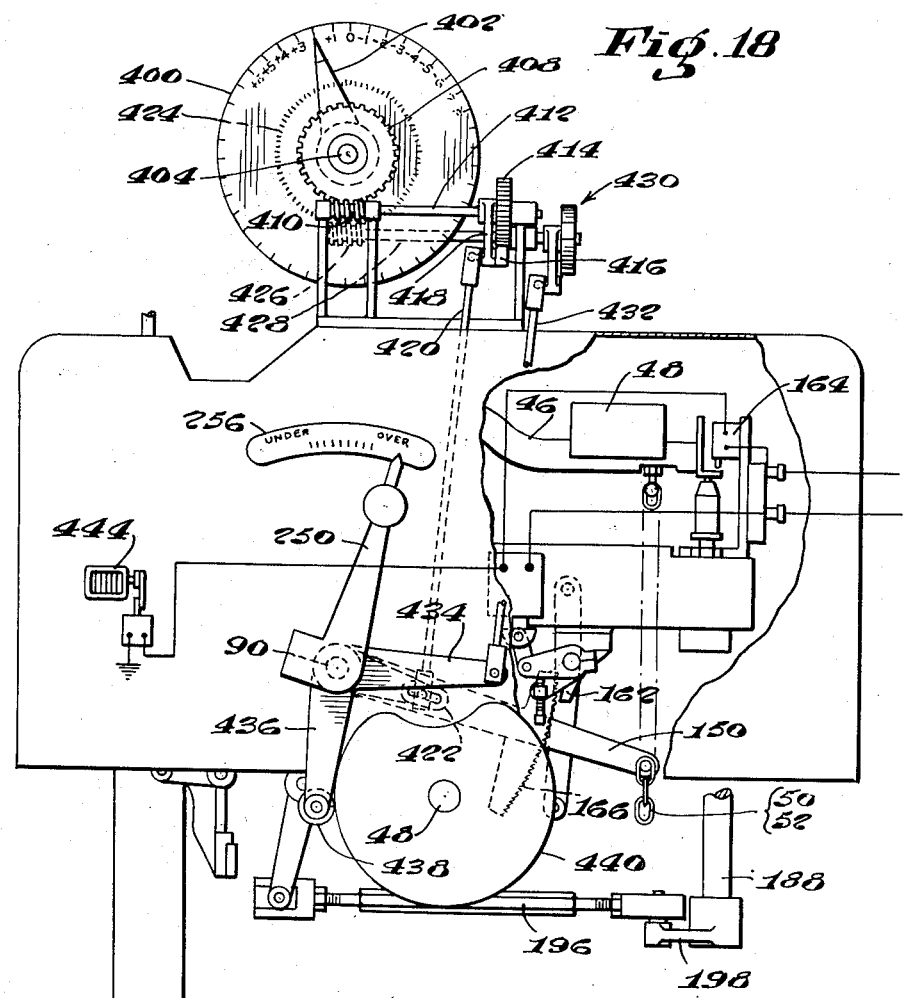
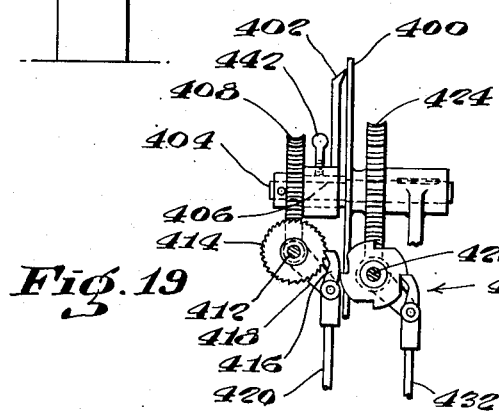
INVENTOR.
Stanley R. Howard
BY J. Stanley Churchill
ATTORNEY April 20, 1954  S. R. HOWARD  2,676,009
CHECK WEIGHING MECHANISM
Filed Dec. 12, 1947  10 Sheets-Sheet 10

INVENTOR.
STANLEY R. HOWARD
BY
J. Stanley Churchill
ATTORNEY

Patented Apr. 20, 1954

2,676,009

UNITED STATES PATENT OFFICE 2,676,009

CHECK WEIGHING MECHANISM

Stanley R. Howard, Milton, Mass., assignor to Pneumatic Scale Corporation, Limited, Quincy, Mass., a corporation of Massachusetts Application December 12, 1947, Serial No. 791,398

23 Claims. (Cl. 265—6)

This invention relates to a check weighing machine.

The invention has for one of its objects to provide a novel check weighing apparatus which is capable of recording information concerning the weights of the packages being check weighed, and the variations in weight from predetermined standards of weight, and other information necessary to enable accurate determination to be made of the performance of the filling or weighing machine with which the present check weighing apparatus may be operated, as will be more fully hereinafter described.

The invention has for another object to provide a novel and improved check weighing machine having provision for checking the weights of filled packages and for selectively separating those packages whose weights vary from a predetermined standard weight, and in which provision is further made for recording the variations in weight of successive packages.

A still further object of the invention is to provide a novel and improved check weighing apparatus having provision for graphically recording the extent of variations in weight of successive filled packages, for selectively counting those packages which exceed or fall below a predetermined tolerance of the correct weight, and for totalizing the net amount of material over or under said correct weight which has been deposited or withheld from the packages within a given period of operation.

With these general objects in view and such others as may hereinafter appear, the invention consists in the check weighing apparatus, in the recording mechanism, and in the various structures, arrangements and combinations of parts hereinafter described and particularly defined in the claims at the end of this specification.

Figure 2:
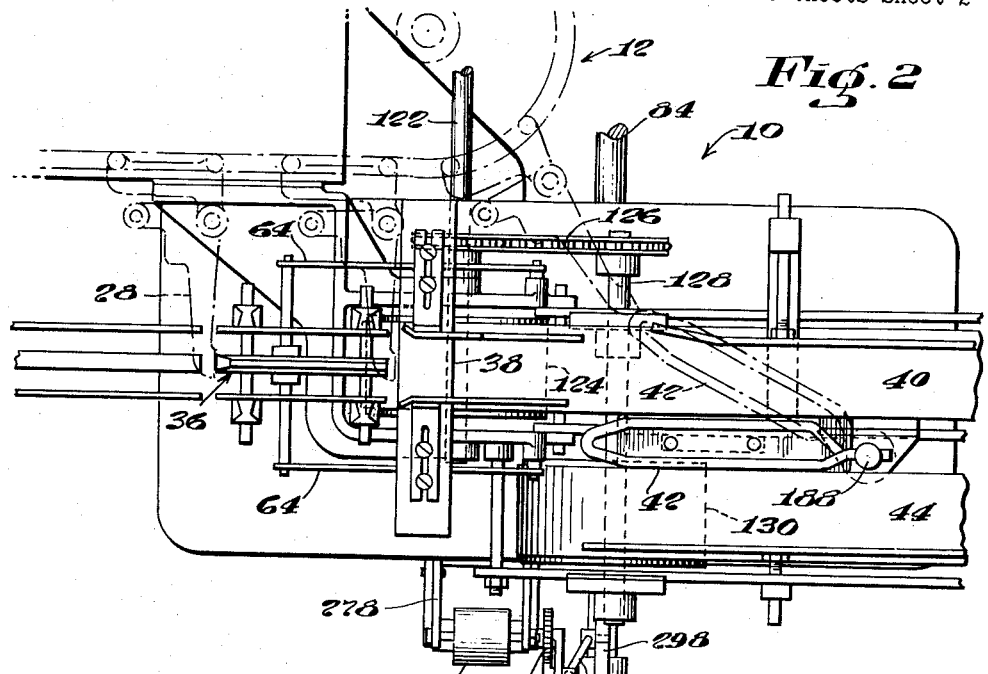
Figure 3:
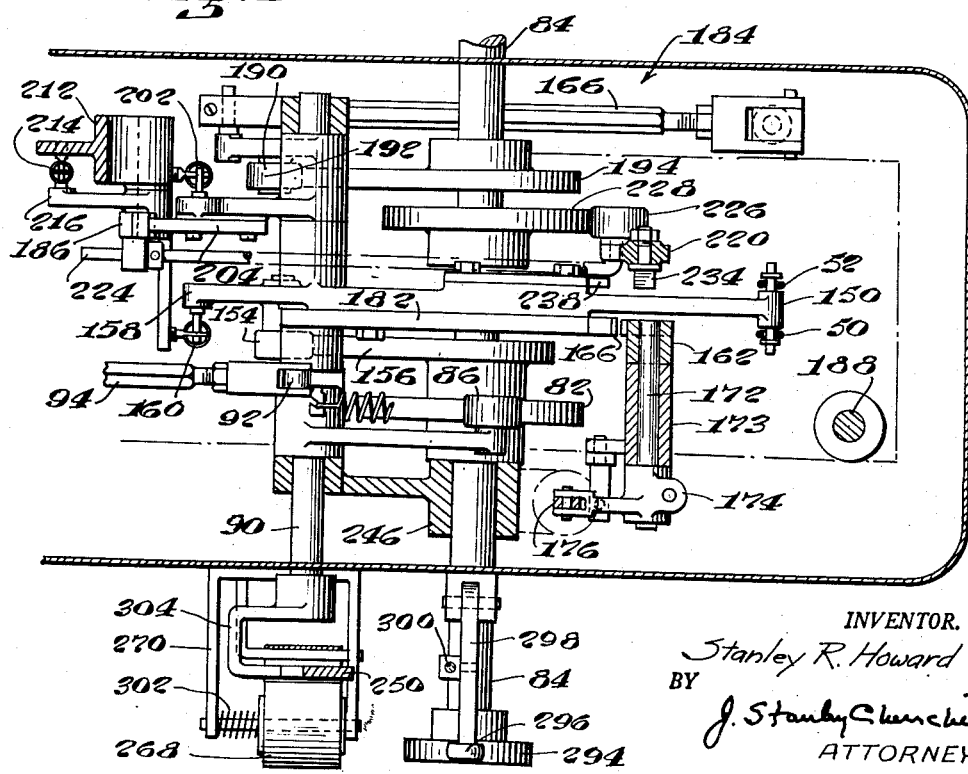
Figure 4:
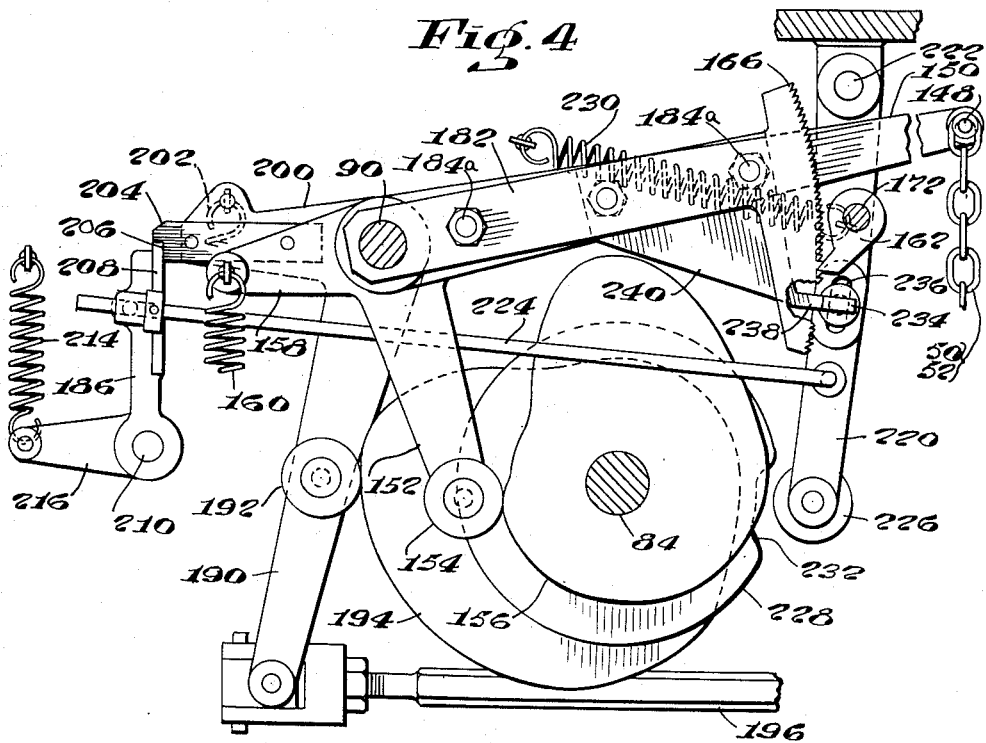
Figure 5:
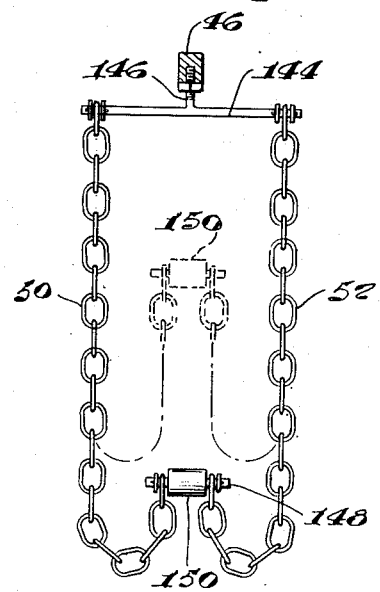
Figure 6:
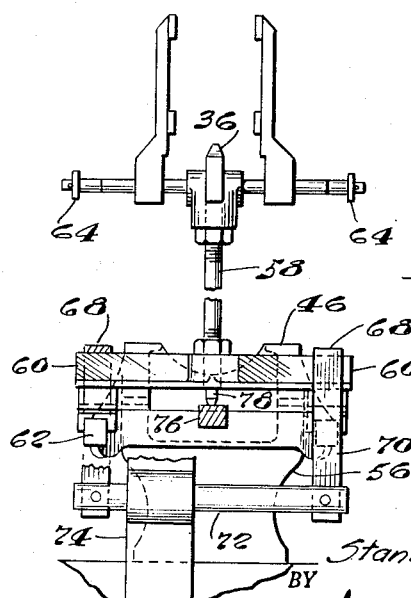
Figure 20:
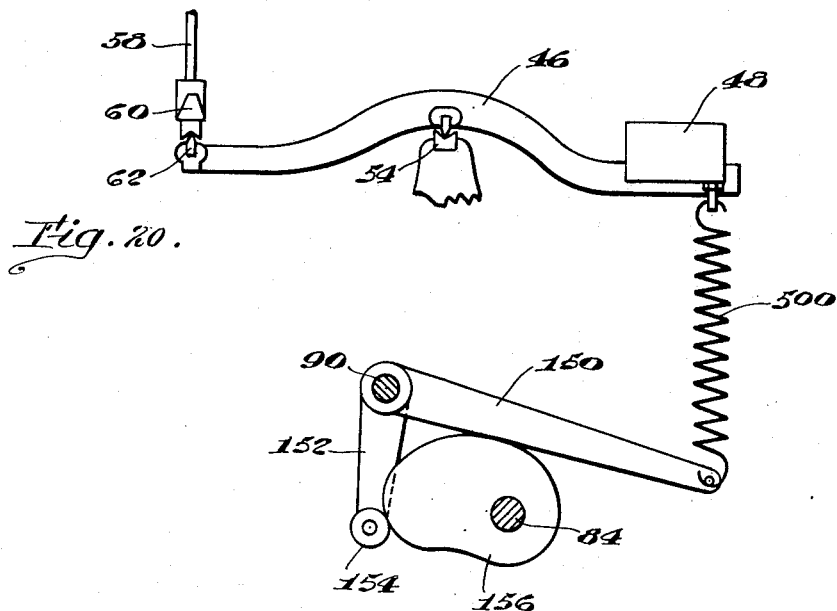
Figure 21:
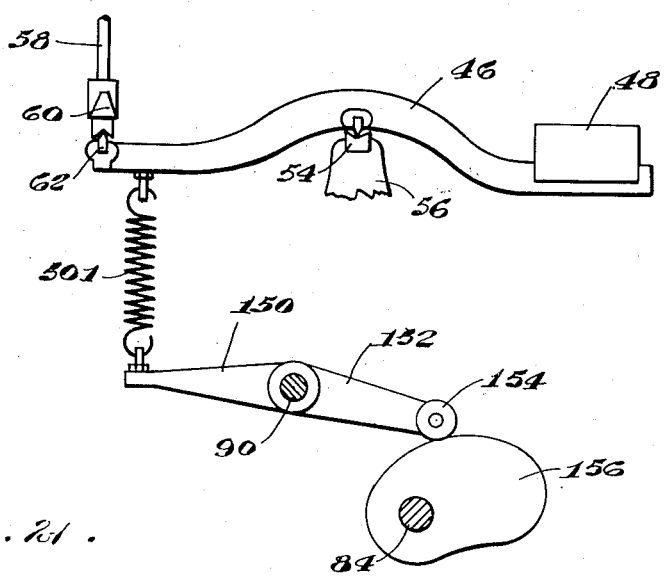

In the drawings illustrating the preferred embodiment of the invention, Fig. 1 is a front elevation of check weighing mechanism embodying the present invention; Fig. 2 is a plan view of the apparatus shown in Fig. 1; Fig. 3 is a plan view of the lower portion of the apparatus shown in Fig. 1 as viewed from the line 3—3; Fig. 4 is a front elevation of a portion of the apparatus illustrated in Fig. 1 and shown at a larger scale; Fig. 5 is a detail view of a variable counterweight mechanism embodied in the present apparatus, as viewed from the right in Fig. 1; Fig. 6 is a detail view of scale locking mechanism embodied in the present apparatus as viewed from the left in Fig. 1; Fig. 7 is a plan view of the lower portion of a two scale weighing machine embodying the present check weighing and recording apparatus; Fig. 8 is a detail view of a one revolution clutch forming a part of the control mechanism for the two scale weighing machine; Fig. 9 is a view as seen from the rear of Fig. 7 showing the drive for the check weighing mechanism and control mechanism for synchronizing the check weighing mechanism with the operation of the two scale weigher; Fig. 10 is a side elevation of a portion of the mechanism shown in Fig. 9; Fig. 11 is a detail view of a one revolution clutch comprising the driving connection to the check weighing apparatus; Fig. 12 is a front elevation of mechanism for graphically recording the variations in weight of successive packages; Fig. 13 is a side elevation of the mechanism shown in Fig. 12; Fig. 14 is a detail view of a section of the recording paper marked by the mechanism shown in Fig. 12; Fig. 15 is front elevation illustrating a modification of the mechanism shown in Fig. 12; Fig. 16 is a detail view of the recording paper marked by the mechanism shown in Fig. 15; Fig. 17 is a front elevation of another form of recording mechanism adapted for selectively counting the packages in the various categories; Fig. 18 is a front elevation of still another form of recording mechanism adapted to indicate the total amount of material over or under a predetermined weight which has been deposited or withheld from the packages within a given period of operation; and Fig. 19 is a detail view in side elevation of the upper portion of the mechanism shown in Fig. 18; and Figs. 20 and 21 are details to be referred to.

In general, the present invention contemplates novel and improved check weighing apparatus for checking the weights of filled packages and for rejecting those packages which are found to deviate from established tolerances of a predetermined standard weight, and, in which provision is further made for recording the weight and the variations in weight from said standard weight of successive filled packages being check weighed whereby to provide a constant check on the operation of the package filling or weighing machine with which the present check weighing apparatus may be used.

The present check weighing apparatus may be embodied as an integral part of a standard filling or weighing machine, or, may be used independently as a separate unit and, in practice, those packages found to be within the predetermined limits of the correct weight are preferably permitted to follow one path to be delivered to other machines for performing subsequent operations thereon and, those packages found to either exceed or fall below predetermined maximum and minimum limits are arranged to be diverted to another path and the rejected packages may be removed by an operator and the contents emptied into the weighing machine hopper and the empty packages being again delivered to the package filling machine.

In accordance with the present invention provision is made for graphically recording the variations in weight of successive filled packages and the extent of such variations preferably in fractions of a weight unit such as an ounce, on a calibrated graphic chart or recording sheet whereby to provide a visual and permanent record of the variations in weight of successive packages. Provision is also made for counting the packages preferably by means of solenoid operated counters arranged to selectively record the number of packages which come within the predetermined tolerances of the correct weight; the number of packages which exceed such predetermined tolerances; and the number of packages which fall below the predetermined tolerance, as well as the total number of packages check weighed whereby the efficiency of the performance of the package filling or weighing machine may be determined. Provision is further made in the preferred embodiment of the invention for totalizing the net variations in the amounts of material in successive packages. Such a total represents the total weight of the variations from the standard weight, and in computing the total the overweight variations are balanced against the underweight variations during a given period of operation.

Referring now to the drawings and particularly to Fig. 7, the present check weighing and recording apparatus indicated generally at 10 is herein illustrated as attached to and operated in timed relation with a standard two scale weighing machine, indicated generally at 12, of the type illustrated and described in the United States Patent to Howard, No. 2,116,895, issued May 10, 1938. In such prior weighing machines, the packages were arranged to be intermittently moved in succession first to a primary or bulk weighing station 14 to receive a partial load of the material, then onto a vibratory platform or settling device 16, and then to a second or final weight station 18 where an additional amount of material is added to complete the weighing operation.

As illustrated herein, the empty cartons 20 are fed into the machine by a constantly driven inlet conveyer 22, the foremost carton thereon engaging a fixed stop 24. A pusher plate 26 is arranged to thereafter engage the first carton on the inlet conveyer and to push it into the path of a carrier arm 28, a plurality of which are attached to an intermittently driven endless chain 30 arranged to run over sprockets 32, 34 disposed at the ends of the machine and arranged to be driven in timed relation to the operation of the weighing mechanisms. As illustrated and described in the Howard patent above referred to, the machine is arranged to operate in successive cycles comprising a package moving cycle during which the cartons are advanced to successive stations of the weighing machine, and a weighing cycle during which the material is introduced into the carton and weighed, the cycles of operation being controlled by the operation of the weighing scales in a manner such that the package moving cycle cannot start until the scales have completed their weighing operations.

As herein shown, the filled packages are arranged to be delivered from the weighing machine directly onto the platform or scale pan 36 of the check weighing scale by the intermittently moved carrier arms 28. After being check weighed a package is moved across a bridge plate 38 and onto a continuously moving conveyer belt 40. In operation, if the package comes within the predetermined tolerances of the correct weight, as determined by the check weighing mechanism, the package may continue its progress along the belt 40 to be discharged from the machine or delivered to subsequent machines for completing the packaging operations. If the package is found to deviate from the established tolerances, provision is made for rocking a rejecting gate 42 diagonally across the conveyer 40 in the path of the package whereby to divert the defective package onto a second conveyor belt 44 to discharge the rejected packages from the machine.

The inlet conveyer belt 22 and the discharge conveyer belts 40, 44 are preferably arranged to be continuously driven through connections from the weighing machine 12, and, as herein shown, the weighing machine is provided with a vertical drive shaft 100 having a bevel gear 102 at its lower end arranged to mesh with a bevel gear 103 fast on a transverse shaft 104. The shaft 104 is geared to a second shaft 106 by spur gears 108, 110, the second shaft being connected by a chain and sprocket drive 112 to the conveyer drive shaft 114 on which the inlet conveyer pulley 116 is mounted for driving the conveyer belt 22. The discharge belts 40, 44 may be similarly driven through chain and sprocket connections 118, 120 from the transverse shaft 106 to the conveyer shaft 122 on which a discharge pulley 124 is mounted for driving the discharge conveyer belt 40, and, a chain and sprocket drive 126 connecting the shaft 122 to the conveyer shaft 128 on which a pulley 130 is mounted for driving the discharge belt 44 for the rejected packages.

Referring now particularly to Fig. 1, the check weighing apparatus comprises a scale beam 46 having the scale pan 36 supported at one end thereof. Provision is made for applying a gradually increasing force to the scale beam to effect movement thereof from a position in which it is overbalanced by an adjustable counterweight 48 supported at the other end of the beam. As herein shown a flexible or variable counterweight comprising a pair of chains 50, 52 is suspended from the counterweight end of the scale beam, the other ends of the chains being arranged to be raised during the check weighing operation to gradually and progressively reduce the effective counterweight. As herein shown, the check scale beam 46 is supported by knife edge bearings 54 in a bracket 56 attached to the machine frame. The scale pan 36 is attached to the upper end of a vertical rod 58 which is provided at its lower end with a transverse bar 60 arranged to rest on knife edge bearings 62 carried by the scale beam 46. Parallel links 64 connected between the machine frame and the scale pan serve to support the latter for vertical movement.

Provision is preferably made for locking the scale pan 36 substantially in alignment with the package supporting rails 66 of the weighing machine during the package moving cycle of operation to prevent displacement of the scale beam 46 during the transfer of a filled package onto the scale pan. As herein shown, the scale pan is limited in its upward movement by laterally extended portions 68 of angle pieces 70 attached to either end of a rod 72 carried by a bracket 74 attached to the machine frame, the extended portions 68 being arranged to engage the upper surfaces of the transverse bar 60. A cooperating cam operated arm 76 is arranged to engage an extended end 78 of the supporting rod 58 depending from the underside of the transverse bar 60 to maintain the scale pan in its raised position during the package moving cycle. The scale pan locking arm 76 is fixed to a shaft 80 rockingly mounted in the bracket 74 and is arranged to be rocked into and out of locking position by a cam 82 fast on a cam shaft 84 and through connections including a cam roll 86 cooperating with the cam 82 and carried by one arm 88 of a two-armed lever pivotally mounted on a rocker shaft 90. The second arm 92 of the two-armed lever is connected by a link 94 to an arm 96 fast on the pivot shaft 80. A spring 98 connected to the arm 92 is arranged to urge the linkage into locking position when permitted to do so by the cam 82.

As illustrated in Figs. 7 and 9, the cam shaft 84 is arranged to be driven from and in timed relation to the weighing machine 12 through connections from the transverse shaft 106 including a pinion 132 fast on the end of shaft 106 and a cooperating gear 134 mounted on a lower shaft 136, the gear 134 forming the driving member of a one revolution clutch, indicated generally at 133, see Fig. 11, for synchronizing the operation of the check weighing mechanism with the weighing machine, as will be hereinafter more fully described. A sprocket 137 also mounted on the shaft 136 and arranged to rotate with the driven member of the one revolution clutch 133 is connected by a chain and sprocket drive 138 to the cam shaft 84.

From the description thus far it will be seen that in operation, a filled package is deposited upon the check weighing scale at the end of the package moving cycle of operation whereupon the locking arm 76 is rocked to unlock the scale and to permit the scale beam to take the weight of the scale pan and the filled package resting thereon. In practice, the counterweights including the adjustable counterweight 48 and the flexible counterweight chains 50, 52 are initially adjusted and arranged to overbalance a package approximating but slightly under a predetermined weight, the counterweight end of the scale beam normally bearing against the upper end of a stop rod 140 extending from and operatively connected to a dash pot 142.

Provision is now made for gradually lifting the lower ends of the chains 50, 52 to reduce the effective counterweight until the scale balances. As shown in detail in Fig. 5 the upper ends of the chains are suspended from the ends of a transverse rod 144 connected midway of its length to the scale beam 46 by an upstanding threaded portion 146. The lower ends of the chains are looped upwardly and hooked over opposite ends of a pin 148 carried by the end of a cam operated counterweight reducing lever 150. The lever 150 is fast on the rocker shaft 90 and forms part of a three-armed lever including an arm 152 carrying a roller 154 for cooperation with a cam 156 fast on the cam shaft 84, and an arm 158 connected by a spring 160 arranged to rockingly urge the counterweight reducing lever 150 upwardly when permitted to do so by the cam 156.

During the check weighing operation, the counterweight reducing lever 150 is gradually rocked upwardly to progressively relieve the scale beam of a portion of the weight of the flexible counterweight chains 50, 52, and, when the weight of the package being check weighed overbalances the counterweights, the counterweight end of the scale beam is rocked upwardly.

In the illustrated embodiment of the invention, provision is made for terminating the upward rocking movement of the counterweight reducing lever 150 immediately upon movement of the scale beam 46 by the reduction of the effective counterweight, and, as herein shown, termination of the upward rocking movement of the lever is arranged to be controlled from the scale beam by the provision of a solenoid operated pawl 162 arranged to be actuated upon closing of a switch 164 when the scale beam balances, and by a ratchet segment 166 carried by the lever 150 and arranged to be engaged by the pawl 162 when the solenoid is energized. As illustrated in Fig. 1, the switch 164 is mounted on a bracket 168 attached to the machine frame and is arranged to be closed by the engagement therewith of an angle piece 170 attached to the end of the scale beam. As better shown in Fig. 3, the pawl 162 is keyed to the end of a rocker shaft 172 journaled in a bracket 173 attached to the underside of the machine frame, and an arm 174 clamped to the other end of the shaft is connected by a link 176 to the armature 178 of the solenoid 180. The arm 174 is arranged to bear against an adjustable stop screw 175 carried by an extension from the bracket 173 for adjusting the position of the pawl 162 relative to the ratchet segment 166. The ratchet segment is formed on the outer end of an arm 182 fitted on the rocker shaft 90 and secured to be movable with the lever 150 by bolts 184a.

With this construction it will be seen that the arcuate movement of the counterweight reducing lever 150 is directly proportional to and indicative of the weight of the package being check weighed so that in practice the lever will be stopped in substantially the same position, herein termed an intermediate position, for each correct weight package, and will be stopped above or below such intermediate position for each over or underweight package respectively. For example, if the package is overweight, only a small amount of counterweight reduction is required, the scale will balance prematurely, and the lever will be stopped during its initial movement or after it has passed through a relatively small arc. Should the package be underweight, more counterweight reduction is required so that the lever 150 will travel through a relatively wide arc before the scale balances to effect termination of the upward rocking movement of the lever.

Provision is made for rejecting those packages found to be over or under the allowable tolerances of the predetermined weight as determined by the position at which the counterweight reducing lever 150 is stopped in response to the movement of the scale beam, and, for rendering the rejecting mechanism inoperative when the package being check weighed is found to be within the predetermined tolerances. As herein shown, the rejecting mechanism comprises a cam operated linkage, indicated generally at 184 which is normally maintained in an inoperative position by a latch arm 186 and arranged to be released when a defective package is detected to effect rocking of a vertical shaft 188 upon which the rejecting gate 42 is mounted. The rejecting mechanism linkage 184 includes a cam lever 190 pivotally mounted on the rocker shaft 90 and having a cam roller 192 mounted intermediate the ends of the lever for cooperation with a cam 194 fast on the cam shaft 84. The outer end of the cam lever 190 is connected by a link 196 to an arm 198 fast on the lower end of the vertical shaft 188. A second arm 200 formed integrally with the cam lever 190 is connected by a spring 202 arranged to urge the linkage 184 in a direction to rock the rejecting gate 42 to a package diverting position when permitted to do so by the cam 194 and by release of the latch member 186.

As herein shown, the arm 200 is provided with an extension 204 having a notch 206 for cooperation with the end 208 of the latch arm 186. The latch arm 186 is pivotally mounted at 210 in a bracket 212 attached to the machine frame, and, a spring 214 connected to a second arm 216 of the latch member is arranged to urge the latch in a clockwise direction into engagement with the notch 206 as shown in Figs. 1 and 4.

As shown in Fig. 4, the mechanism for releasing the latch arm 186 to effect diversion or rejection of a defective weight package onto the rejecting conveyer 44 comprises a cam operated feeler or detecting arm 220 pivotally mounted at 222 and connected to the latch arm 186 by a link 224. The arm 220 is provided with a cam roll 226 for cooperation with a cam 228 fast on the cam shaft 84, and, a spring 230 is arranged to urge the feeler arm in a clockwise direction to follow the cam 228. The cam 228 is designed to hold the feeler arm 220 in a position to maintain the latch 208 in engagement with the notch 206 during the check weighing operation, and, when a sufficient time has elapsed for the check weighing operation to be completed and the counterweight reducing lever brought to rest, the arm 220 is permitted to be rocked clockwise to release the latch, when a defective weight package is detected, by the provision of a low spot or cut out portion 232 of the cam.

The feeler arm 220 is arranged to cooperate with the counterweight reducing lever 150 to prevent release of the latch member 186 when the package is found to be of a weight within the predetermined tolerances, and, as herein shown, the feeler arm is provided with a stop member 234 adjustably mounted in a slotted portion 236 of the arm. The stop member 234 is arranged to engage an abutment 238 carried by the counterweight reducing lever when the latter is brought to rest in an intermediate position, indicating that the weight of the package is within the predetermined tolerance. The abutment 238 comprises an extended portion of a plate member 240 secured to the lever 150 by the bolts 184.

In the operation of the apparatus thus far described, it will be seen that when a package having substantially the correct weight is placed on the scale pan and the scale unlocked, the counterweight reducing lever 150 is rocked upwardly to gradually reduce the effective counterweight until the scale is balanced, whereupon the solenoid operated pawl 162 is actuated to engage the ratchet segment 166 and bring the lever 150 to rest. When the check weighing operation is completed the cam 232 has arrived in a position to permit the feeler arm 220 to be rocked to the left, and, if the package is found to be of substantially the correct weight, the movement of the feeler arm will be interrupted by engagement of the stop lug 234 with the abutment 238 to prevent release of the latch and the package will be permitted to continue along the correct weight package belt 40. In the event that the lever 150 is stopped to present the abutment 238 above or below the stop lug 234, indicating that the package is under or overweight, the feeler arm 220 is permitted to rock to the left to release the latch member and effect diversion of the defective weight package onto the rejecting conveyer belt 44.

As above stated, provision is made for synchronizing the operation of the check weighing apparatus with the two scale weighing machine through the provision of a one revolution pawl and ratchet clutch 133 forming a part of the driving mechanism to the check weighing cam shaft 84. As fully illustrated and described in the Howard Patent No. 2,116,895 above referred to, the weighing machine is arranged to be operated in successive cycles comprising a weighing cycle and a package moving cycle, through the provision of a one revolution clutch, generally indicated herein at 139, and arranged to be controlled by the weighing scales in a manner such as to prevent initiation of the package moving cycle of operation until the scales have completed their weights, the control means including the scale operated pawl stops 251, 253.

The one revolution clutch 139 is arranged to drive the carrier chain 30 through the connections including the bevel gears 141, 143. Provision is also made for driving a control shaft 145 during the package moving cycle through connections including a gear train 147. The control shaft 145 is arranged to operate a resetting bar 149 at the end of the package moving cycle through connections including a cam 151 fast on the shaft 145 and a cooperating roller 153 carried by an arm 155 fast on a pin 157. A second arm 159 also fast on the pin 157 is connected at its lower end to the resetting bar 149. Thus, in the operation of the machine, the resetting bar is moved to the left, viewing Fig. 7, to reset the scales and associated mechanisms, at the end of the package moving cycle of operation, as more fully described in the Howard Patent 2,116,895.

Accordingly, provision is made for controlling the one revolution clutch 133 for the check weigher drive, by the movement of the resetting bar at the end of the package moving cycle so as to start the check weighing operation immediately after a weighed package has been transferred onto the check weighing scale pan 36. As herein shown, the driving element 134 of the one revolution pawl and ratchet clutch 133 is loosely mounted on the shaft 136 and is provided with a ratchet 161 formed integrally therewith. A carrier disc 163 comprising the driven member of the clutch is keyed to the shaft 136 and is provided with a spring-pressed pawl 165 for cooperation with the ratchet 161. The driving sprocket 137 is also keyed to the shaft 136.

As shown in Figs. 9, 10 and 11 a pawl stop 167 is normally arranged in the path of the pawl 165 to effect disengagement thereof from its ratchet 161. The pawl stop 167 is carried by an arm 169 fast on the lower end of a vertical shaft 171. The upper end of the vertical shaft 171 is provided with an arm 177 also fast thereon and connected by a link 179 to an arm 181 fast on a vertical shaft 183 supported in a bracket 185. The arm 181 is formed integrally with an extension 187 normally urged in a clockwise direction, viewing Fig. 7, by a spring 189 and arranged to be engaged by an adjustable pin 191 clamped to the resetting bar 149. Thus, at the end of the package moving cycle of operation, when the resetting bar 149 is moved to effect rocking of the linkage described, the pawl stop arm 169 is rocked out of the path of the pawl 165 to permit it to engage the ratchet 161, the pawl stop being subsequently returned into the path of the pawl by the spring 189 to disengage the pawl and to bring the driven member to rest at the end of one revolution.

A second ratchet 193 carried by the gear 134, and opposed to the ratchet 161 is arranged to cooperate with a second spring-pressed pawl 195 to prevent the driven member or pawl carrier disc 163 from rotating or coasting ahead of the driving gear 134 during operative engagement of the clutch, to thus effect a positive driving connection. A roller 197 carried by an arm 199 fast on a rocker shaft 201 is arranged to cooperate with a cutout portion 203 of the pawl carrier disc 163 to bring the driven member to rest in a predetermined position at the end of each cycle, and, the tail of the pawl 195 is arranged to be simultaneously engaged by the roller 197 to effect disengagement of the pawl from its ratchet 193.

Provision is further made in the illustrated embodiment of the invention for preventing initiation of the package moving cycle of operation until the check weighing apparatus has completed its cycle, that is, when the driven member 163 of the clutch has completed its one revolution and come to rest. This is accomplished by the provision of an additional pawl stop 205 for the one revolution clutch 139 arranged to be controlled through connections from the one revolution clutch 133 in a manner such as to effect withdrawal of the pawl stop 205 when the driven member 163 comes to rest. As herein shown, the rocker shaft 201 is provided with a second arm 207 fast thereon connected to the pawl stop 205 through a series of linkages including a rod 209 connected to an arm 211 fast on a rocker shaft 213 journaled in a bracket 215. An arm 217 also fast on the shaft 213 is connected by a link 219 to a bell-crank 221 pivotally mounted at 223. The second arm of the bell crank is connected by a yieldable link 225 to the pivotally mounted pawl stop 205. A spring 227 connected to the arm 207 is arranged to urge the roller 197 carried by the arm 199 into engagement with the pawl carrier disc 163, the disc being arranged to hold the linkage in a position to maintain the one revolution clutch 139 disengaged until the disc 163 comes to rest whereupon the roller 197 will fall into the cut out 203 thus effecting rocking of the linkage and withdrawal of the pawl stop 205 at the end of the check weighing cycle of operation.

As above described the extent of arcuate movement of the counterweight reducing lever 150, or the rocker shaft 90 to which the lever is fixed, is directly proportional to and indicative of the weight of the package being check weighed. Accordingly, as illustrated in Fig. 12, the mechanism for graphically recording the variations in weight of successive filled packages, and the extent of such variations preferably in fractions of an ounce, as determined by the extent of arcuate movement of the counterweight reducing lever 150 comprises a dial arm 250 attached to and movable with the rocker shaft 90. The recording mechanism is preferably disposed in a convenient and accessible position in front of a guard or cover member 252, the arm 250 being connected to an extended end of the shaft 90, as shown in Fig. 13. The outer end of the dial arm may be provided with a pointer 254 arranged to cooperate with a graduated arcuate dial 256, the graduations being calibrated in fractions of an ounce in accordance with the movement of the arm 150 and the corresponding reduction in effective counterweight, so that the operator may visually determine the condition of the package being check weighed.

The dial arm 250 is further provided with a solenoid operated stylus 258 arranged to mark or indent a recording sheet or graphic chart 260 which may and preferably will be ruled longitudinally with a central line 261 corresponding to the position at which the arm 250 comes to rest when a package is of a correct weight and spaced parallel lines 263 on either side of the central line calibrated in fractions of an ounce in accordance with the arcuate movement of the arm and the corresponding reduction in counterweight. The solenoid operated stylus 258 is arranged to be actuated after the dial arm 250 has come to rest by the provision of an electrical circuit 262 having a cam operated switch 264, the cam 266 being arranged to close the circuit after the check weighing scale has balanced and come to rest to indicate the weight of the package.

As illustrated in Fig. 13 provision is made for supporting and intermittently advancing the recording sheet a relatively small increment with relation to the stylus each cycle of operation to provide a continuous record of the extent of variations in weights of the packages, and, as herein shown, the recording sheet may be supplied in roll form, the supply roll 268 being supported in a bracket 270 and the sheet extending upwardly between guides 272 and over a backing member 274, and then between an intermittently operated roller 282 and a take-up or rewinding roll 276. The rewinding roll is carried on the end of levers 278 pivotally mounted at 280 and is arranged to bear against the intermittently rotated roller 282, being urged thereagainst by a spring 284. The roller 282 is provided with a ratchet 286, and, a cooperating pawl 288 carried by an arm 290, pivotally mounted on the roller shaft 292, is arranged to be rocked to advance the recording sheet a small increment each cycle of operation by a cam 294 fast on the cam shaft 84. A cooperating cam roll 296 carried by an arm 298, is connected by a link 300 to the pawl carrier arm 290. A compression spring 302 is arranged to bear against the side of the supply roll 268 to provide a slight tension in the recording sheet and to maintain the sheet in a relatively taut condition. It will be observed that the lower end of the dial arm 250 connected to the extended end of the rocker shaft 90 is U-shaped as indicated at 304 to provide a space between the end of the shaft and the plane of the arm 250 in order to permit passage of the recording sheet therebetween.

In practice, the weight indicating lines 261, 263 may be calibrated to read in fractions of an ounce or in any convenient or preferred denomination depending on the limit of tolerance desired and in accordance with the proportionate reduction in counterweight during the arcuate movement of the arm 150. In the illustrated embodiment of the invention, as shown in Fig. 14 for example, the space between each weight indicating line may represent $\frac{1}{32}$ of an ounce, the limit of tolerance being $\frac{1}{8}$ of an ounce over or under the exact weight. Thus, in operation, it will be seen that the extent of variations in weight of each package within the prescribed tolerances may be observed within variations of $\frac{1}{32}$ of an ounce.

If it is desired to record the variations in weight of the rejected packages, that is, those packages weighing more than 1/8 of an ounce over or under the predetermined correct weight, the calibrations 263 may be further extended on either side of the central line 261, thus affording a check on variations in weight of the rejected packages as well as those within the prescribed tolerance. The side guides 212 may be cut out as shown at 271 to permit indentations along the marginal edges of the recording sheet 260.

Referring now to Fig. 15, a modified form of the above recording mechanism is designed to record the variations in weight of only those packages whose weights are beyond the prescribed tolerance, that is, those packages weighing more than 1/8 of an ounce over or under the correct weight, the recording sheet 301 being calibrated accordingly as shown in Fig. 16, wherein the weight indicating lines 319 are equally spaced on either side of a central blank portion 321 of the sheet. The modified form of the recording mechanism may comprise apparatus similar to that shown in Figs. 12 and 13 with the exception that provision is made for preventing movement of the recording sheet 301 and operation of the solenoid operated stylus 258 when the weight of the package is within the acceptable limits of tolerance. As herein shown, this may be accomplished by the provision of an electrical circuit 303 having a solenoid operated latch 305 arranged to engage a collar 307 carried by the connecting link 300 to prevent operation of the pawl and ratchet clutch 288, 286 when the package is of a correct weight or within the established tolerance, and, a detecting switch having a movable contact 309 carried by the feeler or detecting arm 220, and two separate stationary contacts 311, 313, one of which, 311, is arranged to close the circuit 303 to the latch solenoid 315 when the feeler arm is held in its correct weight position, as previously described, leaving the stylus solenoid circuit 262 open. When the feeler arm 220 is permitted to rock to its package rejecting position, the circuit 262 to the solenoid operated stylus 258 will be closed at contact 313, leaving the latch solenoid circuit 303 open, as clearly shown in Fig. 15, to permit intermittent movement of the recording sheet 301.

A solenoid operated counter 317, arranged to be actuated by the scale operated switch 164, may also be provided for recording the total number of packages check weighed during a particular run of the machine in order to provide a comparison with the number of unacceptable or rejected packages recorded on the calibrated sheet within the same period.

Referring now to Fig. 17, provision may also be made for recording the number of packages which are indicated as being acceptable or within the prescribed tolerance; the number rejected because of being indicated as overweight; and the number rejected because of being indicated as underweight; as well as the total number of packages check weighed whereby the efficiency of the weighing or filling machine over a given period of operation may be determined. In practice, these recordings may conveniently be made by a plurality of solenoid operated counters arranged in circuits adapted to be closed upon operation of the check weighing apparatus.

As herein shown, the total number of packages check weighed over a given period of time may be recorded on a counter 306 operated by a solenoid 308 which may be included in the circuit for the solenoid 180 and which is arranged to be energized by closing of the switch 164 upon balancing of the scale beam, as previously described.

The solenoid operated counters 310, 312, 314 for recording the number of packages in each individual category, that is, correct, over and underweight packages respectively are arranged in circuits adapted to be closed by the check weighing mechanism in accordance with the disposition of the counterweight reducing members when the check weighing mechanism comes to rest, and, as herein shown, includes a detecting switch having a movable contact 316 carried by the feeler or detecting arm 220 and two separate stationary contacts 318, 320 arranged to close separate circuits for indicating a correct weight package or an incorrect weight package respectively. As hereinbefore described, the feeler arm 220 is held in its outwardly rocked position by the cam 228 until the counterweight reducing mechanism has come to rest whereupon the cut-out portion 232 permits the arm to rock inwardly, and, if the package being check weighed is indicated as being of a correct weight the feeler arm will engage the abutment 238 to bring the arm to rest, such position corresponding to the point at which the contact 316 engages the stationary contact 318 to close the circuit through a lead 322 to the correct weight solenoid 324. A cam operated switch 328 arranged to be actuated after the counterweight reducing mechanism has been brought to rest completes the circuit from the contact 311 through leads 326, 329 to the main line.

When the package being check weighed is indicated as being either over or underweight, the feeler arm 220 is permitted to be rocked to its maximum inward position so that the contact 316 will engage the stationary contact 320 which is arranged to close a circuit through a lead 331 to a slide contact 330 carried by the pointer 254 of the dial arm 250. The slide contact is arranged to engage one or the other of two arcuate contacts 332, 334 comprising the over and underweight contacts respectively, attached to the dial 256. In the event that the dial arm 250 comes to rest with the contact 330 bearing against the overweight contact 332, as determined by the check weighing mechanism, the circuit will be continued through a lead 333 to a solenoid 336 to actuate the overweight counter 312. Similarly, in the event the pointer contact 330 comes to rest on underweight contact 334, the circuit will be continued through a lead 335 to the solenoid 338 to actuate the underweight counter 314. In either event the solenoids will not be energized until the check weighing mechanism has had sufficient time to complete its weighing operation, the switch cam 327 being designed to close the switch 328 as it approaches the end of the check weighing cycle of operation. Thus, it will be seen that an accurate count of the check weighed packages in each class may be obtained through circuits arranged to be closed by the check weighing mechanism in accordance with the disposition of the counterweight reducing lever 150 when the scale balances, and that each and every package will be counted including those within and without the predetermined tolerances for an acceptable weight package. Since each counter is electromagnetically operated it will be apparent that the counters may be located at a place remote from the machine, such as in the production manager's office, so that he may keep a continuous check on the operating efficiency of the weighing or filling machines.

Referring now to Figs. 18 and 19, provision is further made in the illustrated embodiment of the invention for computing and recording the weight differential between the actual weight of all the packages check weighed during a given period and the correct weight for the same number of packages so that a substantially accurate check of the total net amount of material given away or withheld from the entire output within a given period of time can be made and the average weight of each package can be calculated. For example, if successive packages are found by the check weighing mechanism to be underweight, the weight differential recording mechanism will indicate the cumulative amounts of underweight of the total number of packages check weighed; if successive packages are found to be overweight, the present mechanism will indicate the cumulative amount of overweight; and if some of the packages are overweight and some underweight, the amounts in one class will be cancelled out by the amounts in the other class so that the final amount shown by the weight differential indicator at the end of a given period will indicate the net total amount by which the packages vary from the correct weight. Thus, if the amount of overweight material given away is equal to the amount withheld from the underweight packages, the reading on the weight differential indicator will be zero.

As illustrated in Fig. 18, the weight differential indicator may comprise a rotary graduated indicating dial 400 arranged to cooperate with a rotatable pointer 402. As above stated, the extent of arcuate movement of the counterweight reducing lever 150 is directly proportional to the reduction in effective counterweight and indicative of the weight of the package being check weighed. Thus, if it is assumed that the position of termination of the lever when the scale balances for a correct weight package corresponds to an intermediate or fixed position, then the different distances of arcuate movement on either side of said intermediate position will indicate definite variations over or under the correct weight.

In accordance therewith, provision is made in the preferred embodiment of the invention for rotating the pointer 402 a variable distance each cycle of operation corresponding to the arcuate movement of the counterweight reducing lever 150, and, for rotating the dial 400 a fixed distance each cycle of operation equivalent to the movement of the counterweight reducing lever for a correct weight package. As herein shown, both the pointer 402 and dial 400 are mounted to rotate on a shaft 404, the pointer being rotatably adjustable on a sleeve 406 formed integrally with a worm wheel 408 loosely mounted on the shaft 404. The worm wheel 408 is arranged to mesh with a worm gear 410 fast on a shaft 412 and which is arranged to be rotated a variable distance each cycle of operation, in accordance with the arcuate movement of the counterweight reducing lever 150, through connections including a ratchet 414 fast on the shaft 412, a cooperating spring pressed pawl 416 carried by a lever 418 loosely mounted on the shaft 412, and a link 420 connecting the lever 418 to an arm 422 mounted on and movable with the rocker shaft 90. Thus, during each cycle of operation of the check weighing mechanism, the pointer will be rotated a distance proportionate to the variable movement of the counterweight reducing lever 150.

The graduated indicating dial 400 is formed integrally with a worm wheel 424 loosely mounted on the shaft 404 and is arranged to cooperate with a worm gear 426 fast on a shaft 428. The shaft 428 is arranged to be rotated a fixed arcuate distance each cycle of operation through connections including a pawl and ratchet mechanism 430, and a link 432 connected to one arm 434 of a bell crank loosely mounted on the rocker shaft 90. The second arm 436 of the bell crank is provided with a cam roll 438 arranged to cooperate with a cam 440 fast on the cam shaft 48. Thus, during each cycle of operation, the dial 400 will be rotated in the same direction as the pointer a fixed proportionate distance corresponding to the distance that the pointer is moved when the package is indicated as being of the correct weight.

As herein indicated, the rotary dial 400 may be calibrated to indicate the weight of material over or under the correct weight in ounces, pounds, or other convenient units, and, as herein shown, the dial is provided with a zero position having minus characters on one side of the zero point and plus characters on the other side.

In operation, the pointer 402 is initially adjusted on the sleeve 406 by means of a set screw 442 to point to zero on the dial 400. If the packages being check weighed are all of a correct weight, the movement of the dial and the pointer will be equal and there will be no relative movement between them. If the packages are underweight, the pointer will move relatively further than the zero point of the dial and into the minus side thereof. If overweight, the pointer will be moved a relatively lesser distance than the zero point of the dial and onto the plus side thereof. During the course of a day's run, the pointer may move to either side of the zero point in accordance with the weight of the packages being check weighed, so that a reading at any particular time will indicate the differential between the correct weight and the actual weight of all the packages check weighed during such period. For example, if there is a reading of plus 10 ounces after 1000 sixteen ounce packages have been run, it will mean that although some packages may have been slightly underweight and others overweight, a net total of 10 ounces over the total required or correct weight, 16,000 ounces, has been given away during such period, and that the average package weighed one-one hundreth (.010) of an ounce overweight which is well within the commercially allowable limit of tolerance for packaged materials.

A solenoid operated counter 444, operated by the scale beam switch 164 may be provided to record the total number of packages check weighed during any particular period of operation of the weight differential indicator.

As above pointed out the mechanism for applying a gradually increasing force to the scale beam to effect its movement from an initial overbalanced position in which the load or package to be weighed is supported thereon in addition to a means for reducing the effective counterweight may include suitable means for applying a force to either end of the scale beam, and also suitable means for applying variable forces to both ends of the scale beam for accomplishing this result. As shown in detail in Fig. 20, the counterweight end of the scale beam 46 may be connected by a spring 500 to the counterweight reducing lever 150, and as shown in Fig. 21 the counterweight reducing lever 150 may be extended beyond its pivot and a spring 501 arranged to connect the extended end to the package supporting end of the scale beam. In both instances the springs 500, 501 serve instead of the flexible chains 50, 52 to accomplish the desired result.

While the preferred embodiment of the invention has been herein illustrated and described, it will be understood that the invention may be embodied in other forms within the scope of the following claims.

Having thus described the invention what is claimed is:

1. Check weighing mechanism comprising in combination, a movable scale beam, a variable counterweight comprising a flexible member suspended from said scale beam and initially sufficient to overbalance a filled package, means operating independently of the movement of said scale beam for gradually lifting the depending end of said flexible counterweight to reduce the effective counterweight and effect movement of the scale beam during the weighing operation, means actuated in response to the movement of the scale beam to effect termination of operation of said counterweight reducing means, including a movable member arranged to be deflected in accordance with the reduction of the effective counterweight, and recording means operatively connected to said movable member for recording the weight of the package being check weighed in accordance with the deflected position of said movable member and with relation to a desired predetermined weight.

2. Check weighing mechanism comprising, in combination, a movable scale beam, counterweight means for said scale beam sufficient to initially overbalance a filled package means operating independently of the movement of said scale beam including a movable member for gradually decreasing the effect of the counterweight means to effect movement of the scale beam, means actuated in response to the movement of the scale beam for terminating the movement of said movable member, and recording means comprising an intermittently movable recording sheet, means operable in timed relation to said movable member for intermittently advancing said recording sheet, and a marking member operatively connected to and movable with said movable member arranged to cooperate with said recording sheet to provide a permanent record of the weight of successive packages being check weighed.

3. Check weighing mechanism comprising, in combination, a scale beam, a flexible counterweight suspended from said scale beam and initially arranged to overbalance a filled package, counterweight reducing means including a rocking lever operatively connected to the depending end of said flexible counterweight, means for rocking said lever to lift the depending end of said flexible counterweight to effect movement of the scale beam, means actuated in response to the movement of the scale beam for terminating the movement of said lever, the position of said lever when its movement is terminated being related to the reduction in effective counterweight and indicative of the weight of the package being check weighed, and recording means comprising a recording sheet, and a recording member operatively connected to and movable with said lever arranged to cooperate with said recording sheet to provide a permanent record of the weight a package being check weighed.

4. Check weighing mechanism comprising, in combination, a scale beam, counterweight means for said scale beam sufficient to initially overbalance a filled package, means including a movable member for gradually decreasing the effect of the counterweight means to effect movement of the scale beam, means actuated in response to the movement of the scale beam for terminating the movement of said movable member, and recording means comprising a graph sheet having a central line indicating the correct weight and spaced lines on either side of the central line calibrated to indicate definite variations from the correct weight in accordance with the movement of said movable member, means for advancing the graph sheet a small increment for each cycle of check-weighing operation, a solenoid operated stylus operatively connected to and movable with said movable member for cooperation with said graph sheet, and means for operating said stylus to mark the sheet after termination of movement of said movable member.

5. Check weighing mechanism comprising, in combination, a scale beam, counterweight means for said scale beam sufficient to initially overbalance a filled package, means including a movable member for gradually decreasing the effect of the counterweight means to effect movement of the scale beam, means actuated in response to the movement of the scale beam for terminating the movement of said movable member, and recording means comprising a graph sheet having spaced lines on either side of a central portion calibrated to indicate definite variations over and under a predetermined correct weight in accordance with the movement of said movable member, a solenoid operated stylus operatively connected to and movable with said movable member for cooperation with said graph sheet, detecting means cooperating with said movable member after termination of movement of said movable member for indicating whether the checked weight is over or under predetermined limits defining a commercially acceptable package, a sheet, sheet moving means, a stylus engageable with said sheet for marking the same, stylus operating means, and means controlled by said detecting means for effecting operation of said sheet moving means and said stylus operating means.

6. Check weighing mechanism comprising, in combination, a scale beam, counterweight means for said scale beam sufficient to initially overbalance a filled package, means including a movable member for gradually decreasing the effect of said counterweight means to effect movement of the scale beam, means actuated in response to the movement of the scale beam for terminating the movement of said movable member, and recording means comprising a graph sheet having spaced lines on either side of a central portion calibrated to indicate definite variations over and under a predetermined correct weight in accordance with the movement of said movable member, a solenoid operated stylus operatively connected to and movable with said movable member for cooperation with said graph sheet, detecting means cooperating with said movable member after termination of said movement of movable member for indicating whether the checked weight is over or under predetermined limits defining a commercially acceptable package, a sheet, sheet moving means, a stylus engageable with said sheet for marking the same, stylus operating means, means controlled by said detecting means for actuating said sheet moving means and means also controlled by the detecting means for selectively actuating said stylus operating means when the package is indicated as being over or under such commercially acceptable limits, and means actuated by the movement of said scale beam for recording the total number of packages check weighed.

7. Check weighing mechanism comprising, in combination, a scale beam, counterweight means for said scale beam sufficient to initially overbalance a filled package means operating independently of the movement of said scale beam including a movable member for gradually decreasing the effect of said counterweight means to effect movement of the scale beam, means actuated in response to the movement of the scale beam in one direction for terminating the movement of said movable member in a position corresponding to an overweight, underweight or predetermined weight condition of the package being weighed, and recording means comprising an electrical circuit including a plurality of solenoid operated counters including overweight, underweight and predetermined weight counters connected in said circuit, and means operatively connected to and movable with said movable member for selectively actuating said counters in accordance with the position of termination of movement of the movable member for recording the number of overweight, underweight and predetermined weight packages, respectively.

8. Check weighing mechanism comprising, in combination, a scale beam, counterweight means for said scale beam sufficient to initially overbalance a filled package means operating independently of the movement of said scale beam including a movable member for gradually decreasing the effect of said counterweight means to effect movement of the scale beam, means actuated in response to the movement of the scale beam for terminating the movement of said movable member in a position corresponding to an overweight, underweight or predetermined weight condition of the package being weighed, and recording means comprising an electrical circuit including a plurality of solenoid operated counters including overweight, underweight and predetermined weight counters connected in said circuit and means operatively connected to said movable member for selectively actuating said counters in accordance with the position of termination of movement of the movable member for recording the number of successive overweight, underweight and predetermined weight packages respectively, and means actuated by the movement of said scale beam for recording the total number of packages check weighed.

9. Check weighing mechanism comprising, in combination, a scale beam, counterweight means for said scale beam sufficient to initially overbalance a filled package, means including a movable member for gradually decreasing the effect of the counterweight means to effect movement of the scale beam, means actuated in response to the movement of the scale beam for terminating the movement of said movable member when the package being check weighed overbalances the effective counterweight, and recording means comprising a plurality of solenoid operated counters, electrical circuits for said counters, and means for selectively actuating said solenoid operated counters for recording the number of overweight, underweight and correct predetermined weight packages respectively, said selective actuating means including a detecting arm cooperating with said movable member after termination of movement of said movable member for indicating whether the checked weight equals a predetermined weight or deviates from said predetermined weight, a contact carried by said detecting arm, a contact connected in circuit with the solenoid counter which records correct predetermined weight, said last-mentioned contact being engageable by said contact on said detecting arm for closing the circuit to the correct weight counter, a switch arm operatively connected to and movable with said movable member for indicating whether a package deviating from said predetermined weight is over or under the predetermined weight, and contacts connected in circuit with the solenoid counters which record over and under weight, respectively, said last-mentioned contacts being engageable by the contact on said switch arm to effect closing of the circuit to the appropriate over and under weight counter.

10. Check weighing mechanism comprising, in combination, a scale beam, counterweight means for said scale beam sufficient to initially overbalance a filled package means operating independently of the movement of said scale beam including a movable member for gradually decreasing the effect of the counterweight means to effect movement of the scale beam, means actuated in response to the movement of the scale beam for terminating the movement of said movable member in a position corresponding to an overweight, underweight or predetermined weight condition of the package being weighed, and an integrator recording means actuated in accordance with the relative movement of said movable member from an initial position to positions on either side for the correct weight position thereof for totalizing the net amount of overweight or underweight of successive packages being check weighed, said recording means including an indicator movable through a fixed distance, each cycle corresponding to a correct weight movement and a second indicator operatively connected to said movable member for indicating the weight of each package as it is being weighed.

11. Check weighing mechanism comprising, in combination, a scale beam, counterweight means for said scale beam sufficient to initially overbalance a filled package approximating a predetermined weight, means for applying a gradually increasing force to effect movement of the scale beam, means responsive to the movement of the scale beam adapted to effect termination of the application of said force and recording means actuated by the relative movement of said force applying means with respect to a correct weight movement for totalizing the net amount of overweight or underweight of successive packages being check weighed, said totalizing means comprising a rotary graduated dial having a zero position and calibrated on either side of said zero position to indicate overweight and underweight material respectively, a rotatable pointer cooperating with said dial and initially placed at zero, cam operated means operatively connected to said dial for rotating the same through a fixed arc corresponding to a correct weight each cycle of operation, and means operatively connecting said pointer to said force applying means for rotating the pointer through a variable arc each cycle in accordance with the weight of the package being check weighed whereby successive variable amounts of deviation from a correct weight as indicated by the movement of the force applying means are added to or subtracted from the amount indicated on said dial.

12. Check weighing mechanism comprising, in combination, a scale beam, counterweight means for said scale beam sufficient to initially overbalance a filled package, means including a movable member for gradually decreasing the effect of said counterweight means to effect movement of the scale beam, means actuated in response to the movement of the scale beam for terminating the movement of said movable member, and recording means comprising an intermittently movable recording sheet, means for intermittently moving said recording sheet in timed relation to the movement of said movable member, and a marking member operatively connected to and movable with said movable member cooperating with said recording sheet to provide a permanent record of the weight of successive packages being check weighed; and means for counting successive overweight, underweight and correct weight packages, respectively, comprising a plurality of solenoid operated counters arranged to be selectively energized in accordance with the position of termination of operation of the movable member.

13. Check weighing mechanism comprising, in combination, a scale beam, counterweight means for said scale beam sufficient to initially overbalance a filled package; means including a movable member for gradually decreasing the effect of the counterweight means to effect movement of the scale beam, means actuated in response to the movement of the scale beam for terminating the movement of said movable member, and recording means comprising an intermittently movable recording sheet, means for advancing said recording sheet in timed relation to the movement of said movable member and a marking member operatively connected to and movable with said movable member cooperating with said recording sheet to provide a permanent record of the weight of successive packages being check weighed, and totalizing means actuated by the relative movement of said movable member with respect to a correct weight movement thereof for totalizing the net amount of overweight or underweight of successive packages being check weighed.

14. Check weighing mechanism comprising, in combination, a scale beam, counterweight means for said scale beam sufficient to initially overbalance a filled package; means including a movable member for gradually decreasing the effect of the counterweight means to effect movement of the scale beam, means actuated in response to the movement of the scale beam for terminating the movement of said movable member, and recording means comprising an electrical circuit including a plurality of solenoid operated counters connected in said circuit and arranged to be selectively actuated in accordance with the position of termination of movement of the movable members for recording the number of successive overweight, underweight and predetermined weight packages, respectively, and totalizing means actuated by the relative movement of said movable member with respect to a correct weight movement thereof for totalizing the net amount of overweight or underweight of successive packages being check weighed.

15. Check weighing mechanism comprising, in combination, a scale beam, counterweight means for said scale beam sufficient to initially overbalance a filled package, means including a movable member gradually reducing the effect of said counterweight means to effect movement of the scale beam, means actuated in response to the movement of the scale beam for terminating the movement of said movable member, and recording means comprising an intermittently movable recording sheet, means for intermittently moving said recording sheet in timed relation to the movement of said movable member, and a marking member operatively connected to and movable with said movable member cooperating with said recording sheet to provide a permanent record of the weight of successive packages being check weighed, and means for counting successive overweight, underweight and correct weight packages, respectively, comprising an electrical circuit including a plurality of solenoid operated counters connected in said circuit and arranged to be selectively actuated in accordance with the position of termination of operation of the movable member, and totalizing means actuated by the relative movement of said movable member with respect to a correct weight movement thereof for totalizing the net amount of overweight or underweight of successive packages being check weighed.

16. Check weighing mechanism comprising in combination a movable scale beam, counterweight means for said scale beam sufficient to initially overbalance a filled package, means operating independently of the movement of said scale beam including a movable member for gradually decreasing the effect of said counterweight means to thereby cause movement of the scale beam, means actuated in response to the movement of the scale beam for terminating the movement of the movable member in a position corresponding to the weight condition of the package being weighed, and indicating means operatively connected with said movable member to be actuated in response to the position to which the movable member has been moved at the time of the aforesaid termination to thereby indicate the weight of the package with relation to a desired predetermined weight.

17. Check weighing apparatus including a movable load-supporting member having variable counterweight means effective thereon to initially overbalance a predetermined load of a desired weight, a movable counterweight varying member operative to gradually decrease the effect of said counterweight means to thereby cause movement of said load-supporting member, means for moving said counterweight varying member independently of the movement of said load-supporting member, means actuated in response to the movement of the load-supporting member for terminating the movement of the movable member in a position corresponding to the weight of the package being weighed, said counterweight varying member normally being moved to a predetermined position corresponding to said predetermined load and being moved to other positions spaced from said predetermined position by amounts proportional to the amounts of overweights and underweights of the respective weighed loads compared with the weight of said predetermined load, and means actuated in response to the aforesaid movements of said movable member for indicating the difference, if any, between the total amount of overweight and the total amount of underweight of a plurality of weighed loads.

18. Check weighing apparatus including a movable load-supporting member having variable counterweight means effective thereon to initially overbalance a predetermined load of a desired weight, a movable counterweight varying member operative to gradually decrease the effect of said counterweight means to thereby cause movement of said load-supporting member, means for moving said counterweight varying member independently of the movement of said load-supporting member, means actuated in response to the movement of the load-supporting member for terminating the movement of the movable member in a position corresponding to the weight of the package being weighed, said counterweight varying member normally being moved to a predetermined position corresponding to said predetermined load and being moved to other positions spaced from said predetermined position by amounts proportional to the amounts of overweights and underweights of the respective weighed loads compared with the weight of said predetermined load, and means actuatable in response to each movement of said movable member for adding any overweight and for subtracting any underweight, whereby to indicate the net total of overweight and underweight of a plurality of weighed loads.

19. Check weighing apparatus including a movable load-supporting member having variable counterweight means effective thereon to initially overbalance a predetermined load of a desired weight, a movable counterweight varying member operative to gradually decrease the effect of said counterweight means to thereby cause movement of said load-supporting member, means for moving said counterweight varying member independently of the movement of said load-supporting member, means actuated in response to the movement of the load-supporting member for terminating the movement of the movable member in a position corresponding to the weight of the package being weighed, said counterweight varying member normally being moved to a predetermined position corresponding to said predetermined load and being moved to other positions spaced from said predetermined position by amounts proportional to the amount of overweight or underweight of the respective weighed loads compared with the weight of said predetermined load, and indicating means actuatable in response to each movement of said movable member and operable to change its reading by adding on the amount of overweight, if any, or subtracting the amount of underweight, if any, of any given load, from the next preceding reading, whereby the reading at any given time will indicate the difference, if any, between the total amount of overweight and the total amount of underweight of the plurality of weighed loads.

20. Check weighing apparatus for measuring the variation between a standard weight and the actual weights of loads being tested, including a movable scale element having a variable counterweight for weighing the loads to be tested, a movable counterweight varying member operative to gradually decrease the effect of said counterweight, means for moving said member independently of the movement of the scale element during a weighing operation, said scale element being initially counterweighted to be in balance with a predetermined weight differing from the standard weight and to be stationary when the movement of said movable member is started, said scale element being automatically moved by the load being tested when the effective counterweight is in balance with the individual load being tested, means actuated in response to the movement of the scale element for terminating the movement of the movable member in a position corresponding to the weight of the load being tested, whereby the extent of such movement is a measure of the amount the individual load weight varies from the predetermined weight, and totalizing means actuable in response to and through a distance proportional to each movement of said movable member for adding the several distances of movement resulting from the weight variations of a plurality of loads being tested.

21. Check weighing apparatus for measuring the variation between a standard weight and the actual weights of loads being tested, including a movable scale element having a variable counterweight for weighing the loads to be tested, a movable counterweight varying member operative to gradually decrease the effect of said counterweight, means for moving said member independently of the movement of the scale element during a weighing operation, said scale element being initially counterweighted to be in balance with a predetermined weight differing from the standard weight and to be stationary when the movement of said movable member is started, said scale element being automatically moved by the load being tested when the effective counterweight is in balance with the individual load being tested, and control means including a switch actuated in response to movement of the scale element for terminating the movement of said member when the scale is in balance with the individual load being weighed, whereby the extent of such movement is a measure of the amount the individual load weight varies from the predetermined weight, and totalizing means actuable in response to and through a distance proportional to each movement of said movable member for adding the several distances of movement resulting from the weight variations of a plurality of loads being tested.

22. Check weighing apparatus for measuring the variation between a standard weight and the actual weights of loads being tested, including a movable scale element having a variable counterweight for weighing the loads to be tested, a movable counterweight varying member operative to gradually decrease the effect of said counterweight, means for moving said member independently of the movement of the scale element during a weighing operation, said scale element being initially counterweighted to be in balance with a predetermined weight differing from the standard weight and to be stationary when the movement of said movable member is started, said scale element being automatically moved by the load being tested when the effective counterweight is in balance with the individual load being tested, means actuated in response to the movement of the scale element for terminating the movement of the movable member in a position corresponding to the weight of the load being tested, whereby the extent of such movement is a measure of the amount the individual load weight varies from the predetermined weight, and totalizing means actuable in response to and through a distance proportional to each movement of said movable member for adding the several distances of movement resulting from the weight variations of a plurality of loads being tested, and an indicating device for indicating the difference between the added distances of the totalizing means and the same number of added distances corresponding to loads of standard weight, whereby to indicate the net total of overweight and underweight.

23. Check weighing apparatus for measuring the variation in weight of loads being tested including a movable load supporting scale having a variable counterweight for weighing the loads to be tested, a movable counterweight varying member operative to gradually decrease the effect of said counterweight, means for moving said member independently of the movement of the scale during a weighing operation, means responsive to movement of said scale for terminating movement of said member, said scale being counterweighted to be in balance with a predetermined weight when the movement of said member commences and to be in balance with the individual load being tested when the movement terminates, whereby the extent of such movement is a measure of the amount the individual load weight varies from the predetermined weight, and totalizing means actuable in response to and through a distance proportional to each movement of said movable member for adding the several distances of movement resulting from the weight variations of a plurality of loads being tested.

References Cited in the file of this patent

UNITED STATES PATENTS

| Number | Name | Date |
|---|---|---|
| 1,362,333 | Magly | Dec. 14, 1920 |
| 1,463,770 | Bates | July 31, 1923 |
| 1,729,320 | Anderson | Sept. 24, 1929 |
| 1,884,250 | Robert | Oct. 25, 1932 |
| 2,066,763 | Bryce | Jan. 5, 1937 |
| 2,116,895 | Howard | May 10, 1938 |
| 2,121,227 | Haegele | June 21, 1938 |